United States Patent [19]
Kikuchi et al.

[11] Patent Number: 6,074,508
[45] Date of Patent: Jun. 13, 2000

[54] VEHICULAR SEAT FABRICATION SYSTEM AND METHOD

[75] Inventors: Masanobu Kikuchi; Masayoshi Chihaya, both of Kanagawa, Japan

[73] Assignee: Ikeda Bussan Co., Ltd., Ayase, Japan

[21] Appl. No.: 09/042,461

[22] Filed: Mar. 16, 1998

[30] Foreign Application Priority Data

Mar. 28, 1997 [JP] Japan ................................ 9-095027

[51] Int. Cl.$^7$ ........................................................ C09J 5/06
[52] U.S. Cl. ........................ 156/212; 156/228; 156/322
[58] Field of Search .......................... 156/583.6, 583.7, 156/583.8, 583.9, 583.91, 320, 322, 492, 493, 499, 212, 228; 100/269.2, 228; 425/DIG. 128

[56] References Cited

U.S. PATENT DOCUMENTS

| | | | |
|---|---|---|---|
| 2,197,528 | 4/1940 | Makenny et al. | 18/17 |
| 4,929,304 | 5/1990 | Urai et al. | 156/245 |
| 5,356,580 | 10/1994 | Clark et al. | 264/51 |
| 5,643,385 | 7/1997 | Kikuchi et al. | 156/212 |

FOREIGN PATENT DOCUMENTS 5-76664 3/1993 Japan .
7-85757 9/1995 Japan .

*Primary Examiner*—Michael W. Ball
*Assistant Examiner*—Gladys Piazza
*Attorney, Agent, or Firm*—Foley & Lardner

[57] ABSTRACT

A vehicular seat fabrication system for fabricating a seat for an automotive vehicle. The system comprises first and second rows of fabrication devices so that a pair of left-side and right-side fabrication devices are located side by side. Each fabrication device includes a lower base member, and an upper base member which is pivotally connected through a pivot shaft to the lower base member so as to be turnable around the pivot shaft. A lower die is connected to the lower base member and movable upward and downward relative to the lower base member. A skin material is to be set to the lower die. An upper die is secured to the upper base member so that the lower die is approachable to the upper die. A pad material is to be set to at least one of the skin material and the pad material. A heating device is adapted to heat and activate the adhesive, and disposed in the vicinity of the first and second fabrication devices and locatable over each upper base member of the first and second fabrication devices upon each upper base member being turned.

2 Claims, 4 Drawing Sheets

VEHICULAR SEAT FABRICATION SYSTEM AND METHOD

BACKGROUND OF THE INVENTION

1. Field of the Invention

This invention relates to improvements in system and method for fabricating a vehicular seat, and more particularly to the improvement in the system and the method in which a skin material is bonded to a pad material with an adhesive upon closing fabrication dies in which the skin material and the pad material are respectively set on lower and upper dies.

2. Description of the Prior Art

Hitherto a vehicular seat has been fabricated by using a fabrication device 11' as shown in FIG. 5. The fabrication device 11' has lower and upper dies 12', 13' which can be approached to or separated from each other by moving the upper die 13' upward or downward as indicated by a two-headed arrow. A skin material 2' of the vehicular seat is set onto the lower die 12' serving as a skin material setting die, while a pad material 3' is set onto the upper die 13' serving as a pad material setting die. When the lower and upper dies 12', 13' are closed, the skin material 2' is bonded to the surface of the pad material 3' which surface has been coated with an adhesive 5'. A reactive hot-melt adhesive is used as the adhesive 5' which has been previously applied to the pad material. The reactive hot-melt adhesive is activated at a temperature lower than 100° C. and disclosed in Japanese Patent Publication No. 7-85757 and Japanese Patent Provisional Publication No. 5-76664.

However, drawbacks have been encountered in the above-discussed conventional technique, as set forth below. That is, in the conventional technique, it is required to set the pad material 3' to which the reactive hot-melt adhesive has been applied, onto the upper die 13' upon heating and activating the adhesive at the temperature lower than 100° C., when the skin material 2' and the pad material 3' are respectively set to the lower and upper dies 12', 13'. Besides, such setting operation is carried out for each fabrication device 11', and therefore, for example, an adhesive applying device and an adhesive heating device are necessary for each of a plurality of the fabrication devices. As a result, each fabrication device becomes unavoidably large-sized while increasing a waiting time required for steps in the setting operation, and the number of carriers for carrying incomplete products, thereby making the operation of each fabrication device complicated thus degrading the operational efficiency of the fabrication device.

BRIEF SUMMARY OF THE INVENTION

It is an object of the present invention to provide improved vehicular seat fabrication system and method, which can effectively overcome drawbacks encountered in conventional vehicular seat fabrication systems of the similar structure.

Another object of the present invention is to provide improved vehicular seat fabrication system and method, which are largely facilitated and sped up in operation thereby improving operational efficiency for fabricating a vehicular seat, and additionally are excellent from the economical viewpoint.

A further object of the present invention is to provide improved vehicular seat fabrication system and method, which can be reduced in waiting time required for steps in a fabrication process and in number of incomplete products, while minimizing an area required for setting each fabrication device.

A still further object of the present invention is to provide improved vehicular seat fabrication system and method, which can accurately bond a skin material and a pad material without causing a locational error, and fabricate a vehicular seat excellent in contact feeling and in external appearance.

An aspect of the present invention resides in a system for fabricating a vehicular seat, comprising at least first and second fabrication devices which are located side by side. Each fabrication device includes a lower base member, an upper base member which is pivotally connected through a pivot shaft to the lower base member so as to be turnable around the pivot shaft, a lower die connected to the lower base member and movable upward and downward relative to the lower base member, a skin material being to be set to the lower die, an upper die secured to the upper base member so that the lower die is approachable to the upper die, a pad material being to be set to at least one of the skin material and the pad material. A heating device is adapted to heat and activate the adhesive, and disposed in the vicinity of the first and second fabrication devices and locatable over each upper base member of the first and second fabrication devices upon each upper base member being turned.

Another aspect of the present invention resides in a system for fabricating a vehicular seat, comprising at least first and second fabrication devices which are located side by side. Each fabrication device includes a lower base member, an upper base member which is pivotally connected through a pivot shaft to the lower base member so as to be turnable around the pivot shaft, a lower die connected to the lower base member and movable upward and downward relative to the lower base member, a skin material being to be set to the lower die, an upper die secured to the upper base member so that the lower die is approachable to the upper die, a pad material is to be set to the upper die, an adhesive being to be applied to at least one of the skin material and pad material, the first and second fabrication devices being disposed separate from each other to form a space therebetween so that the upper base member is locatable in the space upon being turned around the pivot shaft. A heating device is adapted to heat and activate the adhesive on the pad material, and disposed in the vicinity of the first and second fabrication devices and locatable over each upper base member of the first and second fabrication devices upon each upper base member being turned.

A further aspect of the present invention resides in a method for fabricating a vehicular by using a vehicular seat fabrication system including at least first and second fabrication devices which are located side by side, each fabrication device including a lower base member, an upper base member which is pivotally connected through a pivot shaft to the lower base member so as to be turnable around the pivot shaft, a lower die connected to the lower base member and movable upward and downward relative to the lower base member, a skin material being to be set to the lower die, an upper die secured to the upper base member so that the lower die is approachable to the upper die, a pad material being to be set to the upper die, an adhesive being to be applied at least one of the skin material and the pad material; and a heating device for heating and activating the adhesive, disposed in the vicinity of the first and second fabrication devices and locatable over each upper base member of the first and second fabrication devices upon each upper base member being turned. The method comprises the following steps: (a) setting the pad material to the upper die upon the upper die being turned together with the upper base member around the pivot shaft from a first predetermined angular position to a second predetermined angular position; (b)

applying the adhesive onto the pad material upon the upper die being further turned together with the upper base member around the pivot shaft to a third angular position at which the adhesive faces upward; (c) heating the adhesive by the heating device so that the adhesive is activated; (d) turning the upper die together with the upper base member around the pivot shaft to the first predetermined position; and (e) moving the lower die on which the skin material is set, upward so that the skin material is pressed onto the pad material with the adhesive.

A still further aspect of the present invention resides in a method for fabricating a vehicular seat by using a vehicular seat fabrication system including at least first and second fabrication devices which are located side by side, each fabrication device including a lower base member, an upper base member which is pivotally connected through a pivot shaft to the lower base member so as to be turnable around the pivot shaft, a lower die connected to the lower base member and movable upward and downward relative to the lower base member, a skin material being to be set to the lower die, an upper die secured to the upper base member so that the lower die is approachable to the upper die, a pad material is to be set to the upper die, an adhesive being to be applied to at least one of the skin material and pad material, the first and second fabrication devices being disposed separate from each other to form a space therebetween so that the upper base member is locatable in the space upon being turned around the pivot shaft; and a heating device for heating and activating the adhesive on the pad material, disposed in the vicinity of the first and second fabrication devices and to be locatable over each upper base member of the first and second fabrication devices upon each upper base member being turned. The method comprises the following steps: (a) setting the pad material to the upper die upon the upper die being turned together with the upper base member around the pivot shaft from a first predetermined angular position to a second predetermined angular position; (b) applying the adhesive onto the pad material upon the upper die being further turned together with the upper base member around the pivot shaft to a third angular position at which the upper base member is located between the first and second fabrication devices and the adhesive faces upward; (c) heating the adhesive by the heating device so that the adhesive is activated; (d) turning the upper die together with the upper base member around the pivot shaft to the first predetermined position; and (e) moving the lower die on which the skin material is set, upward so that the skin material is pressed onto the pad material with the adhesive.

According to the vehicular seat fabrication system and method of the present invention, at least a pair of left-side and right-side fabrication devices are provided, in which the lower die is adapted to be movable upward and downward, while the upper die is attached to the upper base member. The upper base member is pivotally connected at its end section with the lower base member so as to be turnable around the pivot shaft. The heating device is located in the vicinity of the left-side and right-side fabrication devices. Here, the pad material is set to the upper die upon maintaining the upper die at the predetermined angular position. Then, the upper die is further turned around the pivot shaft so that the pad material to which the adhesive is applied faces upward to be heated with the heating device, in which the adhesive is activated. Thereafter, the upper die is turned around the pivot shaft to its original position to face the lower die. The lower die provided with the skin material is moved upward to be pressed onto the pad material on the upper die, thus fabricating a vehicular seat. Accordingly, the area on which each fabricating device can be minimized, while the total number of steps in a fabrication process (or bonding process) can be reduced. This reduces the waiting time for each step in the fabrication process and the number of incomplete products, while simplifying the structure of each fabrication device. Additionally, operations for this fabrication process can be facilitated and sped up. Furthermore, bonding between the pad material and the skin material can be accurately accomplished in location thereby preventing a locational error from being produced between the pad material and the skin material, thereby improving contact feeling and external appearance of the produced vehicular seat. It will be appreciated that the vehicular seat fabrication system and method of the present invention are excellent also from the economical viewpoints.

BRIEF DESCRIPTION OF THE DRAWINGS

In the drawings, like reference numerals designate like parts and elements throughout all figures, in which.

DETAILED DESCRIPTION OF THE INVENTION

Figure 1A:
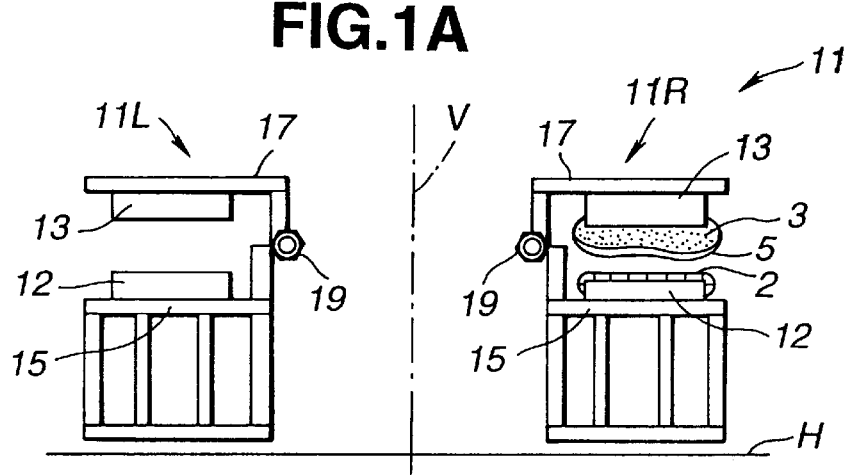
FIG. 1A is a schematic side view of an essential part of an embodiment of a vehicular seat fabrication system according to the present invention, showing an operational mode of the system.

Referring now to FIGS. 1A to 1E and 2, an embodiment of a vehicular seat fabrication system according to the present invention is illustrated by the reference numeral 11. The vehicular seat fabrication of this embodiment is for fabricating a seat back forming part of a seat of an automotive vehicle; however, it will be appreciated that the principle of the present invention is applicable to the vehicular seat fabrication system for fabricating other parts or whole the seat.

Figure 1B:
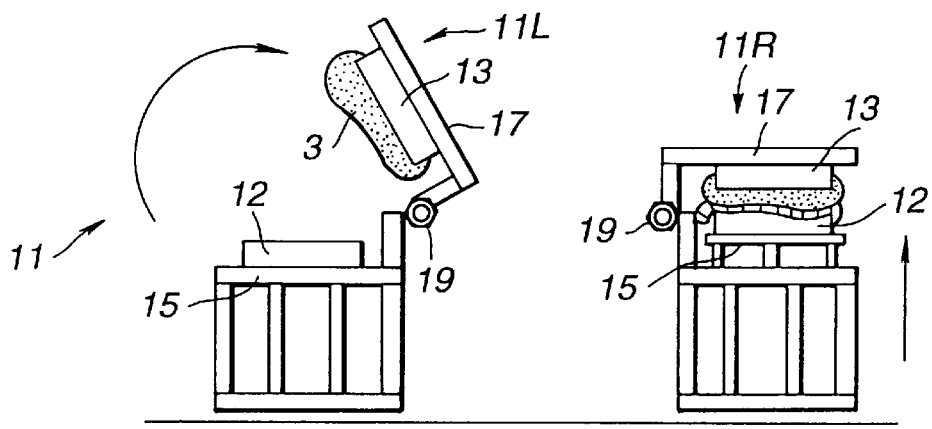
FIGS. 1B to 1E are schematic side views similar to FIG. 1A but showing respectively operational modes different and succeeding from the operational mode of FIG. 1A.
Figure 1C:
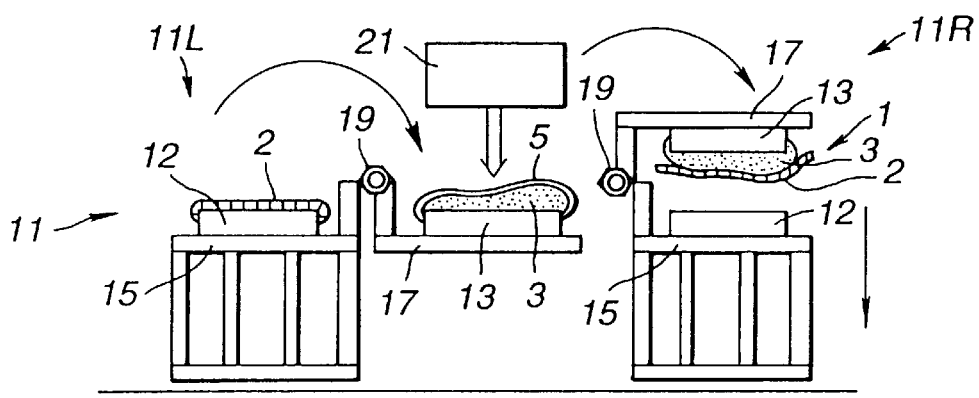
Figure 1D:
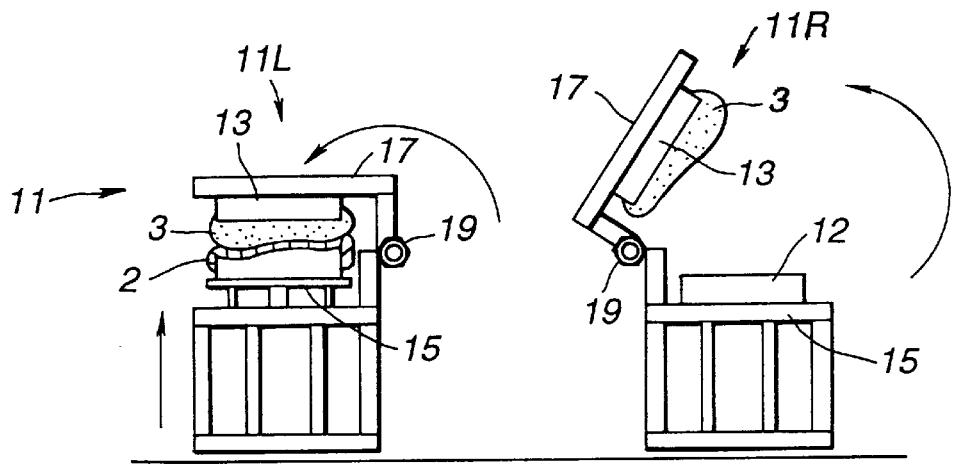
Figure 1E:
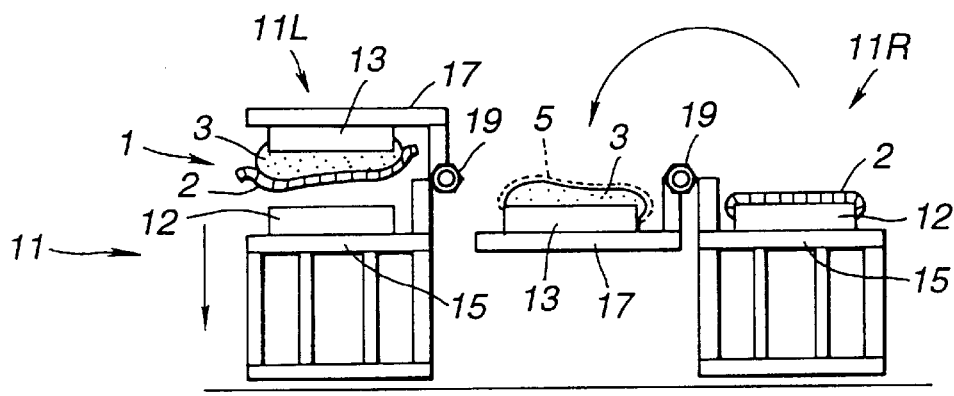
Figure 2:
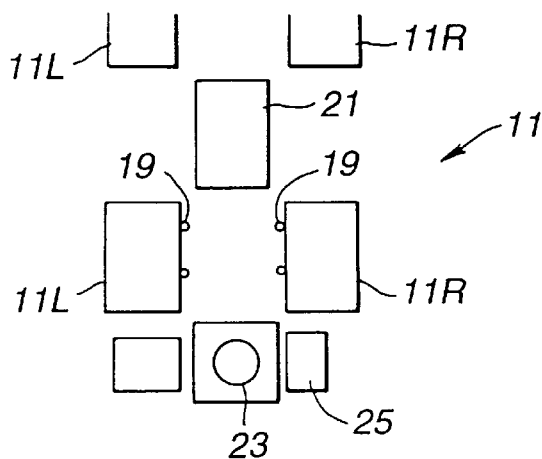
FIG. 2 is a schematic plan view of the essential part of the vehicular seat fabrication system of FIG. 1A.

As illustrated in FIGS. 1A to 1E, the vehicular system fabrication system 11 comprises at least a pair of left-side and right-side fabrication devices 11L, 11R, i.e., a left-side row of a plurality of the fabrication devices 11L and a right-side row of a plurality of the fabrication devices 11R as shown in FIG. 2, in which the pair of the left-side and right-side fabrication devices 11L, 11R are located generally symmetrical to each other with respect to an imaginary vertical plane V positioned between the fabrication devices 11L, 11Rte as shown. Each fabrication device 11L includes a lower die 12 which is mounted on a base table or the lower base member 15 and disposed movable upward and downward relative to the base table 15 under the action of a lifting mechanism (not shown). An upper die 13 is installed to a base plate or upper base member 17 which is generally L-shaped in section. Accordingly, the base plate 17 includes an arm section (no numeral) which pivotally connected to the base table 5, and a flat base section (no numeral) which is integrally connected to the arm section at the right angle in section, in which the upper die 13 is secured to the flat base section. The base plate 17 has an end section which is pivotally connected to the base table 15 through pivot shafts 19 which forms part of a hinge mechanism. In other words, the base plate 17 is hingedly connected to the base table 15. The pivot shafts 19 of the pair of the fabrication devices 11L, 11R are located closer than the lower dies 12, 12 of the pair of the fabrication devices 11L, 11R.

As shown in FIG. 2, a heating device or heater 21 and an adhesive application device 23 are disposed near the pair of the fabrication devices 11L, 11R in such a manner that the vertical plane V passed generally the center of them 21, 23. In other words, the heating device 21 and the adhesive application device 23 are located between the row of the left-side fabrication devices 11L and the row of the right-side fabrication device 11R. A control panel 25 for the heating device 21 and the adhesive application device 23 is disposed near the fabrication device 11R and the adhesive application device 23.

In each fabrication device 11L, 11R, a skin material 2 is installed onto the lower die 12 serving as a skin material setting die. Additionally, a pad material 3 to be covered with the skin material 2 is installed to the upper die 13 serving as a pad material setting die. In case that the pad material 3 is formed with head-rest stay installation holes (through which head-rest stays of the vehicular seat are to be inserted), the pad material 2 is installed onto the upper die 13 while positioning the head-rest stay installation holes relative to the upper die 13.

The adhesive application device 23 is arranged to apply an adhesive 5 onto either one of the pad material 3 and the skin material 2. In this embodiment, the adhesive 5 is applied to the pad material 3. It will be understood that such application of the adhesive 5 may be accomplished by a robot arranged to apply the adhesive 5. It will be also understood that such application of the adhesive 5 to the pad material 3 (or the skin material 2) may be carried out after the pad material 3 (or the skin material 2) is installed to the upper die 13.

The adhesive 5 to be applied to the pad material 3 is a reactive hot-melt adhesive or the like in this instance. This reactive hot-melt adhesive can be activated at a temperature around 60° C. and disclosed in Japanese Patent Publication No. 7-85757 and Japanese Patent Provisional Publication No. 5-76664.

The manner of operation of the vehicular seat fabrication system including the pair of the fabrication devices 11L, 11R will be discussed hereinafter with reference to FIGS. 1A to 1E, in which the left-side and the right-side fabrication devices 11L, 11R are successively operated with a time delay to accomplish each fabrication process for fabricating a seat back forming part of the vehicle seat. This fabrication process includes following steps which are succeeded in the order named:

At the first step shown in FIG. 1A, regarding the left-side fabrication device 11L, the lower and upper dies 12, 13 are located facing each other to be generally parallel with each other.

Regarding the right-side fabrication device 11R, the lower and upper dies 12, 13 have been provided respectively with the skin material 2 and the pad material 3. Additionally, the reactive hot-melt adhesive 5 has been applied onto the pad material 3 and then heated to be activated.

At the second step shown in FIG. 1B, regarding the left-side fabrication device 11L, the base plate 17 with the upper die 13 is upwardly turned around the pivot shafts 19 so that the upper die 13 comes to a predetermined angular position (for example, at 60 degrees) relative to a horizontal plane H corresponding to a floor on which the fabrication devices 11L, 11R are disposed. In this state, the base plate 17 with the upper die 13 is maintained as it is, upon which the pad material 3 is set or installed to the upper die 13.

Regarding the right-side fabrication device 11R, the lower die 12 with the skin material 2 is moved upward under the action of the lifting mechanism, so that the skin material 2 is brought into press contact with the pad material 3.

At the third step shown in FIG. 1C, regarding the left-side fabrication device 11L, the base plate 17 with the upper die 13 is further turned around the pivot shafts 19 so that the upper die 13 comes to a predetermined angular position parallel with the horizontal plane H. At this time, the base plate 17 with the upper die 13 is located in a space formed between the left-side and right-side fabrication devices 11L, 11R. Then, the reactive hot-melt adhesive 5 is applied onto the pad material 3, in which masking may be made to form a non-adhesive section (without the adhesive) at the surface of the pad material 3. In this connection, an adhesive section (with the adhesive) and a non-adhesive section (without the adhesive) may be formed at a seam portion serving as a part of pattern of the skin material 2.

Additionally, the skin material 2 is set or installed onto the lower die 12 whose upper side is opened, during which the reactive hot-melt adhesive 5 applied onto the pad material 3 is heated at about 60° C. by the heating device 21 such as a heating furnace, a device for blowing heated air, or an infrared heater, so that the reactive hot-melt adhesive 5 is activated.

Regarding the right-side fabrication device 11R, after the skin material 2 is brought into press contact with the pad material 3, the lower die 12 is moved downward upon which the skin material 2 is bonded to the pad material 3. Then, the base plate 17 with the upper die 13 is turned around the pivot shafts 19 so that the upper die 13 comes to the predetermined angular position like the left-side fabrication device 11L at the step in FIG. 1B, in which a fabricated seat back 1 (including the pad material 3 and the skin material 2) forming part of the vehicular seat is detached or removed from the upper die 13. Accordingly, the low and upper dies 12, 13 are provided with no material.

At the fourth step shown in FIG. 1D, the base plate 17 is turned conversely around the pivot shaft 19 to be brought into its original angular position as shown in FIG. 1A. Subsequently, the lower die 12 with the skin material 2 is moved upward under the action of the lifting mechanism, so that the skin material 2 is brought into press contact with the pad material 3.

Regarding the right-side fabrication device 11R, the base plate 17 with the upper die 13 is upwardly turned around the pivot shafts 19 so that the upper die 13 comes to a predetermined angular position (for example, at 60 degrees) relative to the horizontal plane H corresponding to the floor on which the fabrication devices 11L, 11R are disposed. In this state, the base plate 17 with the upper die 13 is maintained as it is, upon which the pad material 3 is set or installed to the upper die 13.

At the fifth step shown in FIG. 1E, after the skin material 2 is brought into press contact with the pad material 3, the lower die 12 is moved downward upon which the skin material 2 is bonded to the pad material 3. Then, the base plate 17 with the upper die 13 is turned around the pivot shaft 19 so that the upper die 13 comes to the predetermined angular position as shown in 1B, in which another fabricated seat back 1 (including the pad material 3 and the skin material 2) forming part of the vehicular seat is detached or removed from the upper die 13.

Regarding the right-side fabrication device 11R, the base plate 17 with the upper die 13 is further turned around the pivot shaft 19 so that the upper die 13 comes to the predetermined position parallel with the horizontal plane H. At this time, the base plate 17 with the upper die 13 is located in the space formed between the left-side and right-side fabrication devices 11L, 11R. Then, the reactive hot-melt adhesive 5 is applied onto the pad material 3. Additionally, the skin material 2 is set or installed onto the lower die 12 whose upper side is opened, during which the reactive hot-melt adhesive 5 applied onto the pad material 3 is heated at about 60° C. by the heating device 21, so that the reactive hot-melt adhesive 5 is activated.

Figure 3A:
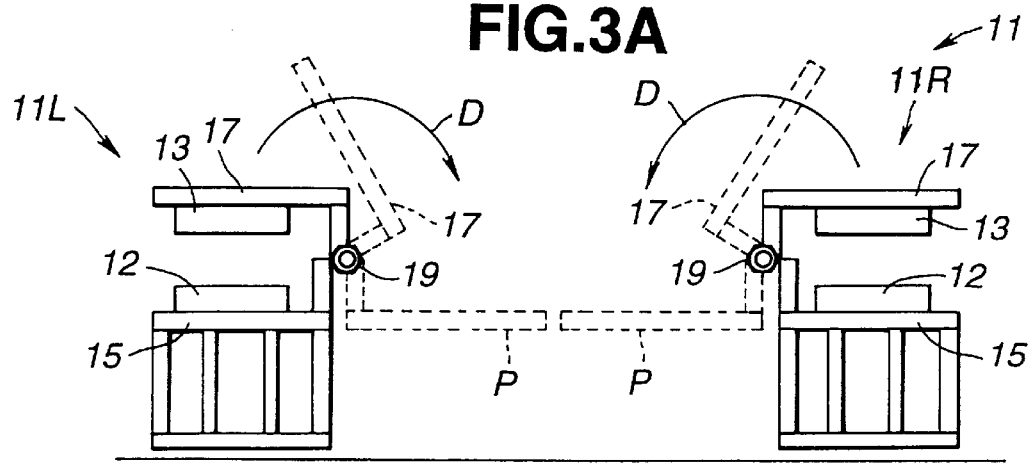
FIG. 3A is a schematic side view of an essential part of another embodiment of the vehicular seat fabrication system according to the present invention.
Figure 3B:
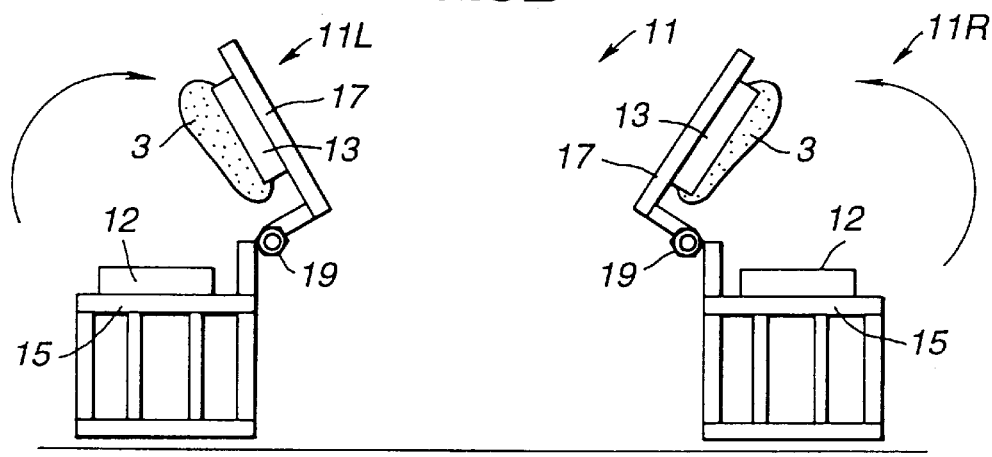
FIGS. 3B to 3C are schematic side views of the essential part of the vehicular seat fabrication system of FIG. 3A.
Figure 3C:
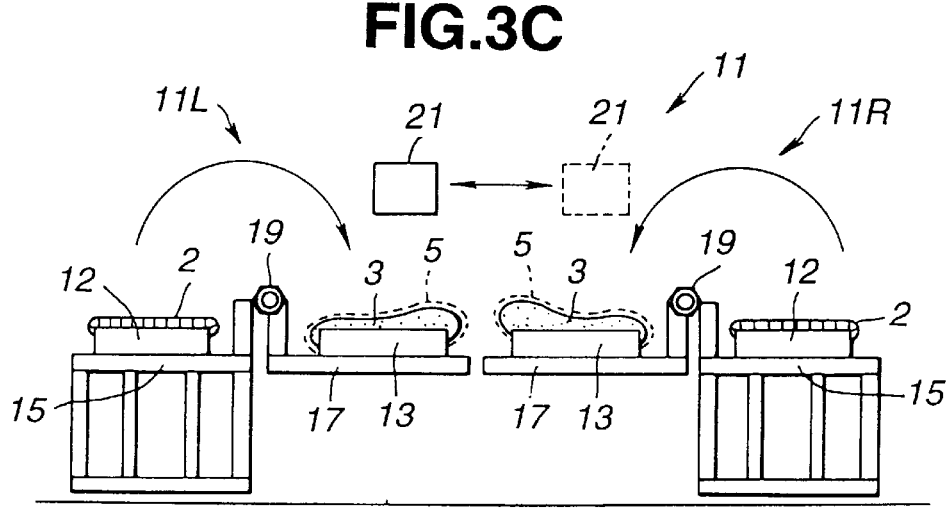

FIGS. 3A to 3C illustrate another embodiment of the vehicular seat fabrication system according to the present invention, similar to the embodiment of FIGS. 1A to 1E and 2. In this embodiment, the left-side and right-side fabrication devices 11L, 11R are separate from each other to form therebetween such a space that the base plates 17, 17 of the left-side and right-side fabrication devices 11L, 11R do not interface with each other as indicated in phantom when the base plates 17, 17 are turned in a direction D to be brought into the predetermined position P at which the upper dies 13, 13 of the left-side and right-side fabrication devices 11L, 11R are parallel with the horizontal plane H. Accordingly, the base plates 17, 17 of the left-side and right-side fabrication devices 11L, 11R can be turned to the predetermined positions P, P simultaneously or with a time delay. Additionally, in this embodiment, the heating device 21 is arranged to be locatable over the upper dies 13, 13 and movable laterally or in left and right directions as indicated by a two-headed arrow in FIG. 3C so as to heat the pad materials 3, 3 (with the reactive hot-melt adhesive 5, 5) on the left-side and right-side fabrication devices 11L, 11R with only the single heating device 21.

Figure 4:
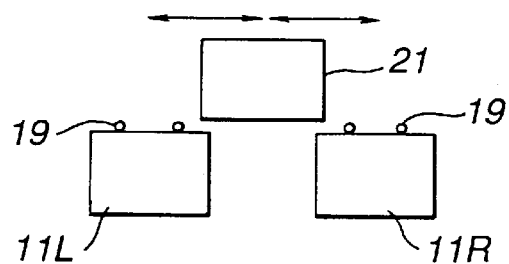
FIG. 4 is a schematic plan view of the essential part of a further embodiment of the vehicular seat fabrication system according to the present invention.
Figure 4:
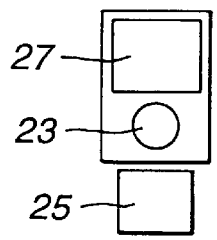
Figure 5:
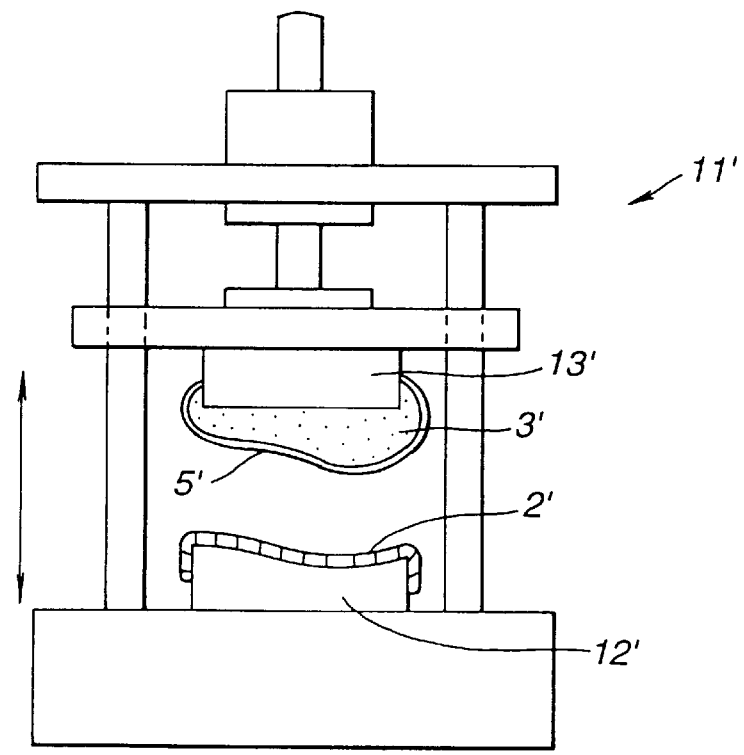
FIG. 5 is a schematic side view of an essential part of a conventional vehicular seat fabrication device.

FIG. 4 illustrates a further embodiment of the vehicular seat fabrication system 11 according to the present invention, similar to the embodiment of FIGS. 1A to 1E and 2. In this embodiment, the left-side and right-side fabrication devices 11L, 11R are located such that the pivot shafts 19, 19 of the devices 11L, 11R are aligned with each other so that the base plates 17 can be turned generally parallelly with each other. Additionally, in this embodiment, the heating device 21 is movable laterally or in left and right directions to heat the pad materials 3, 3 (with the reactive hot-melt adhesives 5, 5) on the left-side and right-side fabrication devices 11L, 11R as indicated by two-headed arrows. Accordingly, the adhesives 5, 5 applied respectively on the pad materials 3, 3 installed on the left-side and right-side fabrication devices 11L, 11R can be successively activated upon being heated, with only the single heating device 21 provided for the pair of the fabrication devices 11L, 11R. The reference numeral 27 in FIG. 4 denotes a table on which the pad material 3 is put. It will be understood that the adhesive 5 may be applied onto the pad material 3 which is put on this table 27.

While the explanation of the above embodiments has been made so that the adhesive 5 is applied onto the pad material 3 after the pad material 3 is installed onto the fabrication devices 11L, 11R, it will be understood that the pad material 3 in a state where the adhesive 5 has been applied to the pad material 3 may be installed to the upper die 13, thereby omitting a step of applying the adhesive 5 onto the pad material 3 which is in a state to be installed to the upper die 13.

What is claimed is:

1. A method for fabricating a vehicular seat by using a vehicular seat fabrication system including at least first and second fabrication devices which are located side by side, each fabrication device including a lower base member, an upper base member which is pivotally connected through a pivot shaft to said lower base member so as to be turnable around the pivot shaft, a lower die connected to said lower base member and movable upward and downward relative to said lower base member, a skin material being set to said lower die, an upper die secured to said upper base member so that said lower die is approachable to said upper die, a pad material being set to said upper die, an adhesive being applied at least one of said skin material and said pad material; and a heating device for heating and activating the adhesive, disposed in the vicinity of said first and second fabrication devices and locatable over each upper base member of said first and second fabrication devices upon each upper base member being turned, said method comprising the following steps:

setting the pad material to said upper die upon said upper die being turned together with said upper base member around said pivot shaft from a first predetermined angular position to a second predetermined angular position;

applying the adhesive onto the pad material upon said upper die being further turned together with said upper base member around said pivot shaft to a third predetermined angular position at which the adhesive faces upward;

heating the adhesive by said heating device so that the adhesive is activated;

turning said upper die together with said upper base member around said pivot shaft to the first predetermined angular position; and moving said lower die on which the skin material is set, upward so that the skin material is pressed onto the pad material with the adhesive.

2. A method for fabricating a vehicular seat by using a vehicular seat fabrication system including at least first and second fabrication devices which are located side by side, each fabrication device including a lower base member, an upper base member which is pivotally connected through a pivot shaft to said lower base member so as to be turnable around the pivot shaft, a lower die connected to said lower base member and movable upward and downward relative to said lower base member, a skin material being set to said lower die, an upper die secured to said upper base member so that said lower die is approachable to said upper die, a pad material being set to said upper die, an adhesive being applied to at least one of the skin material and pad material, said first and second fabrication devices being disposed separate from each other to form a space therebetween so that said upper base member is locatable in said space upon being turned around said pivot shaft; and a heating device for heating and activating the adhesive on the pad material, disposed in the vicinity of said first and second fabrication devices and to be locatable over each upper base member of said first and second fabrication devices upon each upper base member being turned, said method comprising the following steps:

setting the pad material to said upper die upon said upper die being turned together with said upper base member around said pivot shaft from a first predetermined angular position to a second predetermined angular position;

applying the adhesive onto the pad material upon said upper die being further turned together with said upper base member around said pivot shaft to a third angular position at which said upper base member is located between said first and second fabrication devices and the adhesive faces upward;

heating the adhesive by said heating device so that the adhesive is activated;

turning said upper die together with said upper base member around said pivot shaft to the first predetermined angular position; and moving said lower die on which the skin material is set, upward so that the skin material is pressed onto the pad material with the adhesive.

* * * * *